United States Patent [19]

Bernat et al.

[11] 4,274,442
[45] Jun. 23, 1981

[54] MIXER VALVE FOR SANITARY ENGINEERING

[75] Inventors: Georg Bernat, Menden; Karl-Heinz Nolting, Hemer, both of Fed. Rep. of Germany; Claus John, Sonderborg, Denmark

[73] Assignee: Friedrich Grohe Armaturenfabrik GmbH & Co., Hemer, Fed. Rep. of Germany

[21] Appl. No.: 63,563

[22] PCT Filed: May 4, 1979

[86] PCT No.: PCT/DE78/00020

§ 371 Date: May 4, 1979

§ 102(e) Date: May 4, 1979

[87] PCT Pub. No.: WO79/00134

PCT Pub. Date: Mar. 22, 1979

[30] Foreign Application Priority Data

Sep. 7, 1977 [DE] Fed. Rep. of Germany ....... 2740205

[51] Int. Cl.³ ............................................. F16K 11/06
[52] U.S. Cl. ........................... 137/625.17; 137/625.44; 137/625.48; 251/235
[58] Field of Search ........... 137/625.4, 625.44, 625.48, 137/625.17; 251/231, 235

[56] References Cited

U.S. PATENT DOCUMENTS

| 3,324,884 | 6/1967 | Dornaus | 137/625.17 |
|---|---|---|---|
| 3,533,436 | 10/1970 | Parkison | 137/359 |
| 3,533,444 | 10/1970 | Lyon | 137/625.17 |
| 3,788,354 | 1/1974 | Symmons | 137/625.4 |
| 3,854,493 | 12/1974 | Farrell | 137/360 |
| 4,183,377 | 1/1980 | Bernat | 137/625.4 |
| 4,185,659 | 1/1980 | Bernat | 137/625.4 |

FOREIGN PATENT DOCUMENTS 2658022 of 0000 Fed. Rep. of Germany .
2658023 of 0000 Fed. Rep. of Germany .

Primary Examiner—Martin P. Schwadron
Assistant Examiner—A. Michael Chambers
Attorney, Agent, or Firm—James B. Raden; Donald J. Lenkszus

[57] ABSTRACT

Mixer valve for sanitary engineering with a slide plate, adjustable by means of a handle, to regulate the mixture ratio and outflow volume of tap water.

For the precise and comfortable setting of the mixed water temperature in the preferred setting range, particularly between 30° and 45° C., and for the simple, space-saving and cost-favorable manufacture of the device, it is proposed to arrange the slide-plate parallel to the center axis in the valve housing and mount it in a movable and slewable manner around a rotational axis displaceable parallel to the center axis, whereby the slide plate is guided by a head piece displaced in relation to the center axis and protruding from the valve housing on a lever mounted to allow upwards and downwards movement in the jacket of a head housing mounted rotatably around the center axis.

4 Claims, 5 Drawing Figures

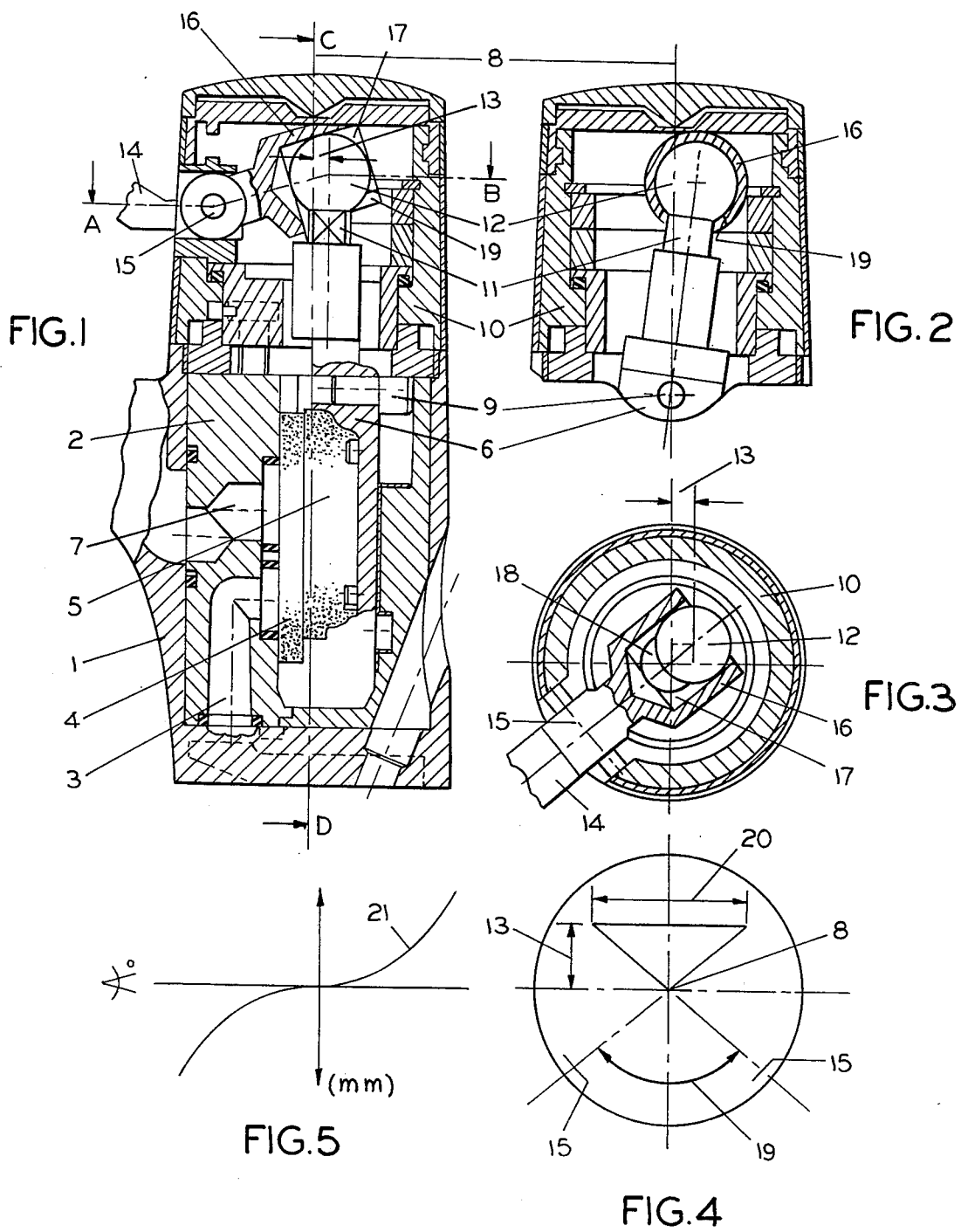

MIXER VALVE FOR SANITARY ENGINEERING

BACKGROUND OF THE INVENTION

The invention relates to a single-handle mixing valve.

Mixer valves of this type are known and consist in the main of a base-plate immovably arranged in the valve housing in which apertures are provided to admit the incoming hot and cold water and to allow the mixed water to flow out. To regulate the mixture and outflow volume, a slide plate is mounted on this base-plate, movable by means of a lever and provided with a transfer flow passage. The outlet flow volume is controlled by upwards and downwards movement and the mixture ratio by sideways movement of the lever. These known types of mixer valve, however, have the disadvantage that they exhibit a proportional or even over-proportional change in the mixture ratio relative to the swivel angle of the lever in the middle swivel angle range, the so-called comfort range, in which mixed water should be provided at a temperature of approx. 30° to 45° C. in the mixer valve. This preferred temperature range can only be set using the known mixer valves to a relatively inaccurate degree. For this reason, precise setting of the outflowing mixed water is virtually impossible which is highly unpleasant particularly in the case of bathing and shower appliances because the human body very quickly senses even the slightest of temperature deviations.

The invention is based upon the need to create a mixer valve of the type described in the introduction which allows particularly precise and comfortable setting of the mixed water temperature in the preferred setting range, particularly between 30° and 45° C., whereby this need also covers the creation of this device in a type simple to design and space-saving and cost-favourable in production, positive in control and featuring a long service life of its mechanisms.

SUMMARY OF THE INVENTION

In accordance with the principles of the invention a single handle mixing valve having a housing having a longitudinal axis and a valve receiving chamber, a fixed valve plate and a sliding valve plate, a valve support carrying the sliding plate within the chamber and having a head piece extending above the housing and connected to the handle has the axis of the head piece spaced a predetermined distance from the longitudinal axis of the housing.

In accordance with the invention the mixture ratio changes in the middle section of the entire swivel range relative to the swivel angle but slightly or sub-proportional and to an accelerated or over-proportional degree in the end ranges where only cold water or hot water is drawn off. The preferred, extended setting range can be optimally determined by the selection of a suitable offset stretch between the ball head and the mean axis.

A mixer valve, operating reliably over a long period of time and precisely adjustable can be provided in an extremely cost-favourable manner by direct control of the lever at the head-piece.

To obtain an extremely long-lasting connection between the head piece and the lever, the ball head is made of a hard and wear-resistant material at least on its surface and is held in the tubular shaped section of the lever of brass or of a similar, solid material with good sliding properties.

Finally, it may be advantageous, e.g. for individual setting of the mixer valve, to arrange the ball head with its neck-piece on the head-piece adjustable in its position to the slide plate.

BRIEF DESCRIPTION OF THE DRAWINGS

An example of an embodiment of the invention is shown in the drawing and will be described in greater detail below.

FIG. 1 shows a longitudinal section through a mixer valve;

FIG. 2 shows a longitudinal section through the head region on the plane C-D of FIG. 1;

FIG. 3 shows a section on the plane A-B of FIG. 1;

FIG. 4 shows a schematic representation of the process when the mixture ratio is set; and FIG. 5 shows a graphic representation to illustrate the mode of operation of the mixer valve.

DETAILED DESCRIPTION

A valve housing 2 is carried in a fitting 1. Sealed in the bottom part, the incoming streams of cold water and hot water are fed to a base-plate 4, held in form-fitting manner in the housing, through passages 3 and pass through apertures into a cross transfer passage of a slide plate 5 movably held on a head-piece 6. The mixed water produced at this point passes through a passage 7 into the outlet of the fitting. By moving the slide plate 5 parallel to the mean axis 8, the two inlet flow apertures in the base-plate 4, arranged parallel to each other, are opened or closed to a greater or lesser degree depending upon the direction of movement to regulate the outlet flow volume. The mixture ratio of cold and hot water, i.e. the temperature setting of the outflowing mixed water, is set by swivelling the head-piece 6 with the slide plate 5 held in form-fitting manner around an axially movable-rotating axis 9 located at right angles to the mean axis 8 to the base-plate 4. During this swivel operation, approximately the same overall through-flow cross section of the two inlet flow apertures for hot water and cold water, arranged in parallel, is maintained whereby the one through-flow aperture is reduced in cross-section and the other increased in cross-section to approximately the same degree. Consequently, the mixture ratio is altered, i.e. there is a change in the temperature of the outflowing mixed water.

A head housing 10 is secured on the fitting 1 with limited rotatability and accommodates the outer part of the head-piece 6 with a slender neck-piece 11 and a ball head 12. The ball head 12 with the slender neck-piece 11 is arranged offset to the mean axis 8 by the offset stretch 13.

A lever 14 is mounted in the generated surface in the head housing 10 allowing upwards and downwards movement around an axis 15. The lever 14 has a tubular shaped section 16 in the head housing 10 in which a coaxial cylindrical bore 17 is formed. The bore takes the form of a slide guide and accommodates the ball head 12 as a fitting part whereby the tubular section 16 is provided with a longitudinal slot 18 in its wall to allow the neck-piece 11 to pass through. The longitudinal slot is so shaped that its side walls 19 correspond in shape to the maximum swivel angle of the neck-piece.

Actuation of the mixer valve to control the outflowing volume of mixed water can be seen in FIG. 1. By moving the lever 14 upwards and downwards around the axis 15, the ball head 12 with the head piece 6 and the form-fitting slide plate 5 is displaced upwards or downwards parallel to the mean axis 8 so that corresponding changes in the same direction occur at the two through-apertures for hot and cold water.

The mixture ratio is set by swivelling the lever 14 with the head housing 10 coupled round the mean axis 8 as can be seen in particular in FIG. 4. The ball head 12 is guided over the stretch 20 by a swivel angle 19 of the lever 14. This relationship is shown graphically in FIG. 5 whereby the swivel angle is shown in degrees on the abscissa and the displacement stretch is shown in millimeters on the ordinate. Here, the line 21 represents the displacement as a function of the swivel angle. It can be clearly seen from the illustration that retarded displacement of the ball head 12 takes place in the medium range and accelerated displacement in the end ranges. The preferred setting range can be extended to optimum as desired by suitable selection of the offset stretch 13.

What is claimed is:

1. A single-handle mixing valve for mixing hot and cold water sources and providing an output thereof, comprising:

a housing having a longitudinal axis, first and second inlet bores communicating respectively with said hot and cold water sources, a discharge passage, and a valve receiving chamber;

a handle means;

a first valve plate fixably mounted within said chamber and having a first surface parallel to said longitudinal axis and having first, second and third passages respectively communicating with said first inlet bore, said second inlet bore and said discharge passage;

a valve support means having a first portion extending into said chamber and a second portion coupled to said handle means;

a second valve plate carried by said support means first portion and having a second surface parallel to said longitudinal axis and adapted to slidably engage said first surface, said second surface having a mixing recess;

said valve support means second portion comprises a head-piece having a central axis spaced apart a predetermined distance from said longitudinal axis;

said handle means comprising a jacket portion rotatable around said longitudinal axis and a lever pivotally mounted on said jacket portion and pivotally connected to said head piece;

slidable pivot means for translating a rotational displacement of said jacket portion in a first direction to a pivotal displacement of said valve plate and for translating axial displacement of said lever in a second direction to a displacement of said valve plate parallel to said longitudinal axis, said central axis of said head-piece being disposed between said longitudinal axis and said slidable pivotal means, wherein displacement of said lever in said first direction varies the mixture of said hot and cold water in nonlinear relationship and wherein displacement of said lever in said second direction varies the volume of said mixture through said discharge passage.

2. A mixer valve in accordance with claim 1 wherein said headpiece comprises a neck piece and a ball head;

said lever includes a tubular end portion having a cylindrical bore adapted to receive said ball head, and a longitudinal slot parallel to the axis of said end portion bore, said slot being adapted to receive said neck piece, said ball head being movable relative to said bore.

3. A mixer valve in accordance with claim 2 wherein the side walls of said longitudinal slot are inclined, the angle of inclination of said side walls equals the maximum pivotal displacement of said neck piece.

4. A mixer valve in accordance with claim 2 wherein said tubular end portion comprises brass.

* * * * *